United States Patent
Yun et al.

(10) Patent No.: US 9,424,757 B2
(45) Date of Patent: Aug. 23, 2016

(54) METHOD OF PLAYING MUSIC BASED ON CHORDS AND ELECTRONIC DEVICE IMPLEMENTING THE SAME

(71) Applicant: Samsung Electronics Co., Ltd., Suwon-si, Gyeonggi-do (KR)

(72) Inventors: Joongsam Yun, Seoul (KR); Sungwook Ji, Seoul (KR); Haeseok Oh, Gumi-si (KR); Sangwon Shim, Incheon (KR); Moonsik Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/617,093

(22) Filed: Feb. 9, 2015

(65) Prior Publication Data

US 2015/0228202 A1 Aug. 13, 2015

(30) Foreign Application Priority Data

Feb. 10, 2014 (KR) ........................ 10-2014-0014663

(51) Int. Cl.
*G10H 1/38* (2006.01)
*G09B 15/08* (2006.01)

(52) U.S. Cl.
CPC ................. *G09B 15/08* (2013.01); *G10H 1/38* (2013.01); *G10H 2210/576* (2013.01); *G10H 2220/241* (2013.01)

(58) Field of Classification Search
CPC ..... G06F 3/0488; G06F 3/0416; G06F 3/041; G06F 3/04886; G06F 2203/04104; G06F 3/016; G06F 3/04817; G06F 17/3074; G06F 3/16; G06F 2203/0339; G06F 3/03547; G06F 17/30017; G10H 1/0066; G10H 2220/096; G10H 2240/145; G10H 2240/056
See application file for complete search history.

(56) References Cited

U.S. PATENT DOCUMENTS

| | | | |
|---|---|---|---|
| 5,430,244 A | 7/1995 | Ruffcorn et al. | |
| 5,670,729 A | 9/1997 | Miller et al. | |
| 6,515,211 B2 | 2/2003 | Umezawa et al. | |
| 6,541,688 B2 | 4/2003 | Asahi et al. | |
| 2001/0047717 A1* | 12/2001 | Aoki | H04M 19/041 84/611 |
| 2008/0058101 A1* | 3/2008 | Hato | A63F 13/10 463/35 |
| 2010/0287471 A1* | 11/2010 | Nam | G06F 3/011 715/702 |
| 2010/0288108 A1 | 11/2010 | Jung et al. | |
| 2012/0160079 A1* | 6/2012 | Little | G10H 1/38 84/613 |
| 2012/0174735 A1* | 7/2012 | Little | G10H 1/0008 84/613 |
| 2012/0254751 A1* | 10/2012 | Kim | G06F 3/165 715/716 |
| 2013/0104725 A1* | 5/2013 | Little | G10H 1/0025 84/613 |
| 2013/0157761 A1* | 6/2013 | Cichowlas | A63F 9/24 463/31 |

(Continued)

FOREIGN PATENT DOCUMENTS

GB 2277190 A 10/1994

*Primary Examiner* — Marlon Fletcher
(74) *Attorney, Agent, or Firm* — Jefferson IP Law, LLP

(57) ABSTRACT

A method of playing music based on chords in an electronic device is provided. The method includes identifying background music related to a piece of music to load sound source data synchronized with the background music from a memory, reproducing the background music, identifying chords corresponding to the reproduced background music in the sound source data, configuring notes corresponding to the chords as notes corresponding to touch objects displayed on the touch screen, and when the chords are changed, reconfiguring notes corresponding to the changed chords as the notes corresponding to the touch objects.

20 Claims, 6 Drawing Sheets

(56) References Cited

U.S. PATENT DOCUMENTS

2014/0083279 A1* 3/2014 Little .................. G10H 1/0008
  84/609

2015/0228202 A1* 8/2015 Yun ........................ G09B 15/08
  84/477 R
2015/0268926 A1* 9/2015 Panaiotis ................ G06F 3/167
  715/716

* cited by examiner

METHOD OF PLAYING MUSIC BASED ON CHORDS AND ELECTRONIC DEVICE IMPLEMENTING THE SAME

CROSS-REFERENCE TO RELATED APPLICATION(S)

This application claims the benefit under 35 U.S.C. §119 (a) of a Korean patent application filed on Feb. 10, 2014 in the Korean Intellectual Property Office and assigned Serial number 10-2014-0014663, the entire disclosure of which is hereby incorporated by reference.

TECHNICAL FIELD

The present disclosure relates to a method in which a user can easily play music using notes appropriate for corresponding chords and an electronic device implementing the same.

BACKGROUND

Music is the art of expressing thoughts and emotions by synthesizing a beat, a tune, and a harmony according to a predetermined law and format based on notes and noises in the audio frequency band. A beat, referred to as a rhythm, refers to a temporal combination of various long/short notes and dynamics and is the most important element forming the basis of music. A tune, referred to as a melody, is temporal harmony of various high/low notes and long/short notes. Unlike a rhythm, a tune is the expression of music and plays an important role in expressing people's emotions. In addition, a tune, as an element that best represents musical expression and people's emotions, may be a linear connection of notes formed by horizontally combining notes having various pitches and lengths. A harmony is a connection of chords generated when two or more notes sound at the same time. A harmony is a simultaneous (vertical) combination of multiple notes, whereas a melody is a successive (horizontal) and monotonic arrangement of notes having different pitches.

Among terms related to music, chords indicate notes synthesized when two or more notes having different pitches sound simultaneously. Chords are denoted by a root note and intervals of constituent notes. The chords may be differentiated according to the name of a root note and may be twelve in number. In addition, the chords may be differentiated according to constituent notes thereof, in which case the chords are divided into major chords and minor chords according to the length of the third, each of which has the perfect fifth. There are diminish chords that have the diminished fifth and the minor third, and augment chords that have the augmented fifth and the major third. Quartal chords are formed by adding the seventh to triads. Major 7 is formed by adding the major seventh to a major triad, Dominant 7 is formed by adding the minor seventh to a major triad, and Minor 7 is formed by adding the minor seventh to a minor triad. A method of writing chords with the name of a root note and constituent notes (e.g., C, Am, Em, or G7) is being widely used in popular music such as folk songs or pop songs. A harmony denotes a connection of chords in which two or more notes having different pitches sound simultaneously. The harmony serves to add a tone color effect by strengthening a melody and a rhythm in a background thereof. In addition, the harmony imparts greater width, depth, and richness to music.

In a so-called tonal harmony by major and minor keys, a triad in which three notes overlap each other at an interval of the third from a root note (e.g., the first) makes up a fundamental chord. A pitch denotes the highness and lowness of a note and as a frequency increases on the basis of the fundamental frequency, a note becomes higher. The name of a note indicates a pitch thereof. The names of notes are arranged in units of semi-tone in order of A, Bb, B, C, Db, D, Eb, E, F, Gb, G, and Ab. An octave refers to the interval between one note and another note with double its frequency. Notes in octave relationships are perceived as being the same as each other, and a note an octave higher than A is also referred to as A. An octave is written with a number there behind. A4 is a note having a fundamental frequency of 440 Hz, and a note an octave higher than A4 is A5. Another method of representing a pitch is an integer notation. A# and Bb have the same pitch in the equal temperament. The integer notation is a method of representing a pitch with an integer between 0 and 11 in units of semi-tone in order to prevent the repetitive notation. Although having been proposed to mainly analyze/compose atonal music, the integer notation is also used to transmit a Midi Note Number (e.g., a number expressing highness and lowness of a note in Midi data) due to usefulness in computer processing. For example, the Midi Note Number is increased/decreased by 1 at an interval of semi-tone, with a central C (C4) set to 60. The amount of difference in pitch between two notes is referred to as an interval. A particular pitch has no musical meaning. The particular pitch has meaning only as a relationship with other notes, namely, as an interval. There are two musically important methods of determining a standard note of an interval. One is to identify intervals of notes of a musical scale based on a key note, and the other is to identify intervals of chords and melodies based on the standard note of the chords. There is a method of writing an interval in units of Do based on a major scale. In this method, the interval of two notes on the same step in a musical scale is referred to as the first or the same, and the interval of two notes on adjacent different steps is referred to as the second. As the distance is increased by one step, namely, the second again, the interval is sequentially referred to as the third, the fourth, the fifth, the sixth, and the seventh, and the eighth is also referred to as an octave. The type of Do is divided into "perfect," "major," and "minor." When one semi-tone is increased in "perfect" and "major," it is referred to as "augmented," and when one semi-tone is decreased in "perfect" and "minor," it is referred to as "diminished." When constituent notes of a musical scale are written with intervals, a key note may be the criterion, and when constituent notes of chords are written with intervals, a root note of the chords may be the criterion. The root note of the chords is written with a roman numeral based on the key note. Another method is to use the name of a scale (Movable Do). The name of a scale is used for expressing constituent notes of a musical scale, instead of expressing constituent notes of chords. Tonality refers to a phenomenon that any one note predominates as a central note and other notes are subordinate to the central note (key note). For example, music in a major scale with note C as a key note is referred to as "C major," in which case the note C is the center of the music and the rest has functionality according to relationships with the note C. Determining a key depends upon a key note, and there are twelve major keys and twelve minor keys in European music. In a musical scale of tonal music, notes are sequentially arranged in order of particular intervals from a key note, and western music is based on a heptatonic scale. Constituent notes of a musical scale are referred to as the name of a scale and are arranged in order of Do, Re, Mi, Fa, Sol, La, Si, Do, Re, etc. A major scale begins with Do, and a minor scale begins with La. Notes between Mi and Fa and between Si and Do are semi-tones, and the rest has intervals of whole tones.

The above information is presented as background information only to assist with an understanding of the present disclosure. No determination has been made, and no assertion is made, as to whether any of the above might be applicable as prior art with regard to the present disclosure.

SUMMARY

There have already been applications capable of playing music, with activation of smart phone markets and application markets. A user can play melodious music through the existing music play applications only when the user knows, through a score, how to play an instrument. If there is no score with which the user plays music, the user has to memorize chords in measures of particular music, and therefore, it is nearly impossible for a beginner in music to easily play melodious music. Aspects of the present disclosure are to address at least the above-mentioned problems and/or disadvantages and to provide at least the advantages described below. Accordingly, an aspect of the present disclosure is to provide a method in which a user can easily play music using notes appropriate for corresponding chords and an electronic device implementing the same. In various embodiments of the present disclosure, chords can be identified at a particular timing point (e.g., a measure and a beat) by analyzing chord progression of music, and notes appropriate for the corresponding chords can be configured as notes corresponding to touch objects (e.g., user interface), thereby helping a user easily play the music. That is, an application according to an embodiment of the present disclosure can identify chords of background music related to a piece of music and configure notes appropriate for the chords as notes corresponding to touch objects displayed on a touch screen. Therefore, beginners in music can easily play melodious music without the score thereof, by touching touch objects.

In accordance with an aspect of the present disclosure, a method of playing music based on chords in an electronic device is provided. The method includes identifying background music related to a piece of music to load sound source data synchronized with the background music from a memory, reproducing the background music, identifying chords corresponding to the reproduced background music in the sound source data, configuring notes corresponding to the chords as notes corresponding to touch objects displayed on the touch screen, and when the chords are changed, reconfiguring notes corresponding to the changed chords as the notes corresponding to the touch objects.

In accordance with another aspect of the present disclosure, an electronic device is provided. The electronic device includes a memory, a touch screen configured to display touch objects and to receive a touch input, a speaker configured to reproduce background music and notes corresponding to the touch objects, and a processor configured to identify the background music to load sound source data synchronized with the background music from a memory, to reproduce the background music, to identifies chords corresponding to the reproduced background music in the sound source data, to configure notes corresponding to the chords as the notes corresponding to the touch objects, to reconfigure notes corresponding to changed chords as the notes corresponding to the touch objects when the chords are changed, and to reproduce the notes corresponding to the touch objects in response to the touch input.

In accordance with yet another aspect of the present disclosure, at least one non-transitory processor readable medium storing a computer program of instructions configured to be readable by at least one processor for instructing the at least one processor to execute a computer process for performing a method, is provided. The method includes identifying background music related to the music to load sound source data synchronized with the background music from a memory, reproducing the background music, identifying chords corresponding to the reproduced background music in the sound source data, configuring notes corresponding to the chords as notes corresponding to touch objects displayed on the touch screen, and when the chords are changed, reconfiguring notes corresponding to the changed chords as the notes corresponding to the touch objects.

The present disclosure provides a method of playing music based on chords and an electronic device implementing the same, in which the electronic device can identify chords of background music and configure notes appropriate for the corresponding chords as notes corresponding to touch objects (e.g., user interface) while the background music related to a piece of music is being reproduced. In relation to the corresponding chords, the electronic device configures musically well-matched notes as the notes corresponding to the touch objects. Therefore, a user can play the entire well matched music through a touch input for the touch objects. That is, the user can play the entire piece of music appropriate for background music without any knowledge of music or without the score of the music.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
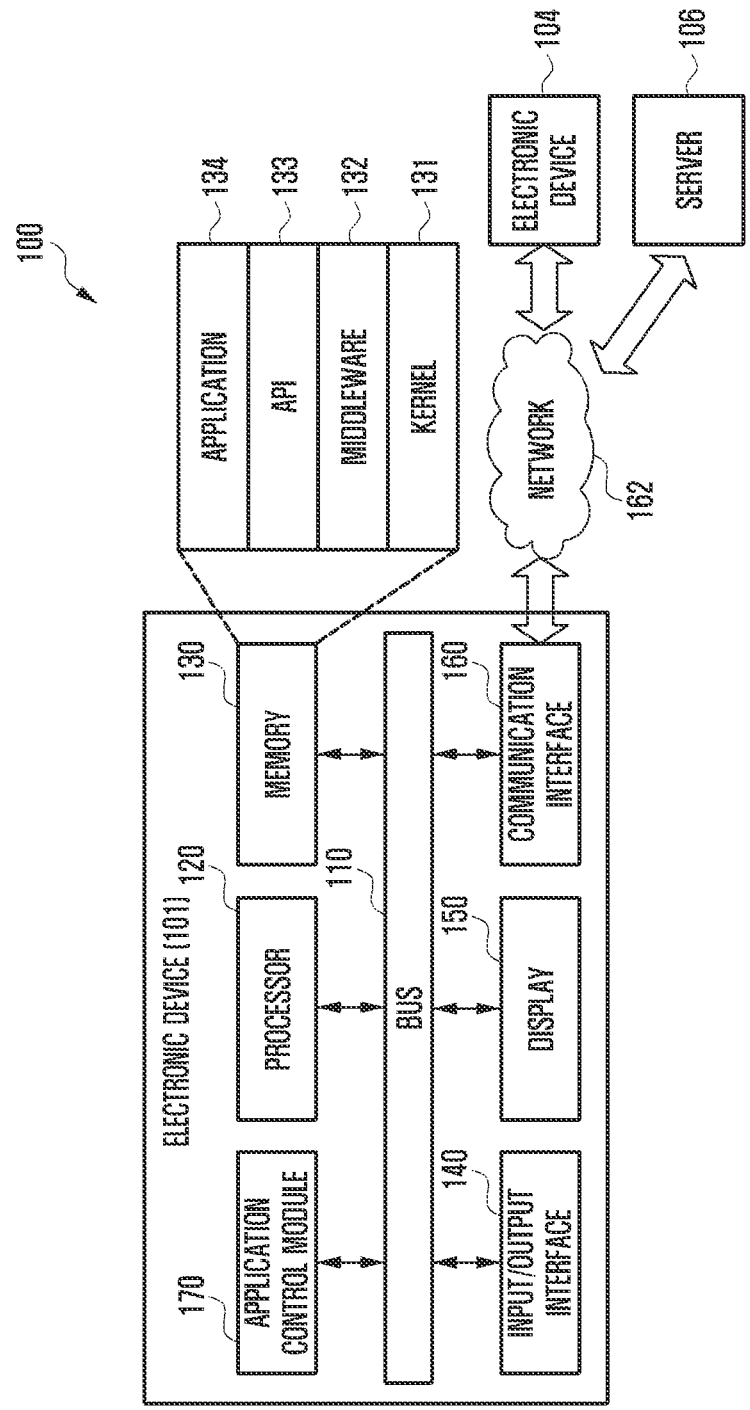
FIG. 1 is a block diagram illustrating a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that the expressions "comprises" and "may comprise" is used to specify presence of disclosed function, operation, component, etc. but do not preclude the presence of one or more functions, operations, components, etc. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof. In the present disclosure, the expression "and/or" is taken as specific disclosure of each and any combination of enumerated things. For example, A and/or B is to be taken as specific disclosure of each of A, B, and A and B.

As used herein, terms such as "first," "second," etc. are used to describe various components, however, it is obvious that the components should not be defined by these terms. For example, the terms do not restrict the order and/or importance of the corresponding components. The terms are used only for distinguishing one component from another component. For example, a first component may be referred to as a second component and likewise, a second component may also be referred to as a first component, without departing from the teaching of the inventive concept.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

By way of example, in the expression "reproduction of music", the term "music" may mean music with voice signals converted into data, and the term "reproduction" may mean an operation of converting the data of the music into voice signals and outputting the converted voice signals through an output medium (e.g., a speaker or earphones).

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

According to various embodiments of the present disclosure, the electronic device may include devices having an operation support function. Examples of the electronic device may include smartphone, tablet Personal Computer (PC), mobile phone, video phone, electronic book (e-book) reader, desktop PC, laptop PC, netbook computer, Personal Digital Assistant (PDA), Portable Multimedia Player (PMP), digital audio player, mobile medical appliance, camera, wearable device (e.g., head-mounted device (HMD) such as electronic glasses), electronic clothing, electronic bracelet, electronic necklace, electronic appcessory, electronic tattoo, smartwatch, etc.

According to an embodiment of the present disclosure, the electronic device may be one of smart home appliances having operation support function. Examples of the smart electronic appliance as an electronic device may include television (TV), Digital Video Disk (DVD) player, audio player, refrigerator, air-conditioner, vacuum cleaner, electronic oven, microwave oven, laundry machine, air cleaner, set-top box, TV box (e.g., Samsung HomeSync™, Apple TV™, and Google TV™), game console, electronic dictionary, electronic key, camcorder, and electronic frame, etc.

According to an embodiment of the present disclosure, examples of the electronic device may include medical device (e.g., Magnetic Resonance Angiography (MRA), Magnetic Resonance Imaging (MRI), Computed Tomography (CT)), Navigation device, Global Positioning System (GPS) receiver, Event Data Recorder (EDR), Flight Data Recorder (FDR), car infotainment device, maritime electronic device (e.g., maritime navigation device and gyro compass), aviation electronic device (avionics), security device, vehicle head unit, industrial or home robot, Automatic Teller's Machine (ATM) of financial institution, Point of Sales (POS), etc.

According to an embodiment of the present disclosure, examples of the electronic device may include furniture and building/structure having a communication function, electronic board, electronic signature receiving device, projector, and metering device (e.g., water, electric, gas, and electric wave metering devices). According to various embodiments of the present disclosure, the electronic device may be any combination of the aforementioned devices. According to various embodiments of the present disclosure, the electronic device may be a flexible device. It is obvious to those skilled in the art that the electronic device is not limited to the aforementioned devices.

Descriptions are made of the electronic devices according to various embodiments with reference to accompanying drawings hereinafter. The term 'user' used in various embodiments of the present disclosure may denote a person or a device (e.g., artificial intelligent electronic device) using the electronic device.

FIG. 1 illustrates a network environment 100 including an electronic device 101 according to various embodiments of the present disclosure.

Referring to FIG. 1, the electronic device 101 may include a bus 110, a processor 120, a memory 130, an input/output interface 140, a display 150, a communication interface 160, and an application control module 170.

The bus 110 connects the aforementioned components to each other and may be a circuit of exchanging signals (e.g., control messages) among the components.

For example, the processor 120 receives a command from any of the aforementioned components (e.g., memory 130, input/output interface 140, display 150, communication interface 160, and application control module 170) through the bus 110, interprets the command, and executes operation or data processing according to the decrypted command.

The memory 130 may store the command or data received from the processor 120 or other components (e.g., input/output interface 140, display 150, communication interface 160, application control module 170, etc.) or generated by the processor 120 or other components. The memory 130 may store program modules including kernel 131, middleware 132, Application Programming Interface (API) 133, applications 134, etc. Each programing module may be implemented as software, firmware, hardware, and any combination thereof.

The kernel 131 may control or manage the system resources (e.g., bus 110, processor 120, and memory 130) for use in executing the operation or function implemented with the middleware 132, the API 133, or the applications 134. The kernel 131 also may provide an interface allowing the middleware 132, API 133, or applications 134 to access the components of the electronic device 101 to control or manage.

The middleware 132 may work as a relay of data communicated between the API 133 or applications 134 and the kernel 131. The middleware 132 may execute control of the task requests from the applications 134 in such a way of assigning priority for use of the system resource (e.g., bus 110, processor 120, and memory 130) of the electronic device to at least one of the applications 134.

The API 133 is the interface for the applications 134 to control the function provided by the kernel 131 or the middleware 132 and may include at least one interface or function (e.g., command) for file control, window control, image control, or text control.

According to various embodiments of the present disclosure, the applications 134 may include Short Messaging Service/Multimedia Messaging Service (SMS/MMS) application, email application, calendar application, alarm application, health care application (e.g., application of measuring quantity of motion or blood sugar level), and environmental information application (e.g., atmospheric pressure, humidity, and temperature applications). Additionally or alternatively, the applications 134 may be an application related to information exchange between the electronic device 101 and other external electronic device (e.g., electronic device 104). Examples of the information exchange application may include a notification relay application for relaying specific information to the external electronic device and a device management application for managing the external electronic device.

For example, the notification relay application may be provided with a function of relaying the alarm information generated by the other applications (e.g., SMS/MMS application, email application, health care application, and environmental information application) of the electronic device 101 to an external electronic device (e.g., electronic device 104). Additionally or alternatively, the notification relay application may provide the user with the notification information received from an external electronic device (e.g., electronic device 104). The electronic device application may manage (e.g., install, delete, and update) the function of an external electronic device (e.g., turn-on/off of the electronic device 104 itself (or a part of it) or adjustment of the brightness (or resolution) of the display) which communicates with the electronic device 101 or the service (e.g., communication or messaging service) provided by the external electronic device or an application running on the external device.

According to various embodiments of the present disclosure, the applications 134 may include an application designated according to the property (e.g., type) of an external electronic device (electronic device 104). If the external electronic device is the digital audio player, the applications 134 may include a music playback application. Similarly, if the external electronic device is a mobile medical appliance, the applications 134 may include a health care application. According to an embodiment of the present disclosure, the applications 134 may include at least one of applications designated to the electronic device 101 or the applications received from the external electronic device (e.g., server 106 and electronic device 104).

The input/output interface 140 delivers the command or data input by the user through with an input/output device (e.g., sensor, keyboard, and touchscreen) to the processor 120, memory 130, communication interface 160, and/or application control module 170 through the bus 110. For example, the input/output interface 140 may provide the processor 120 with the data corresponding to the touch may by the user on the touchscreen. The input/output interface 140 may output the command or data (which is received from the processor 120, memory 130, communication interfaced 160, or the application control module 170 through the bus 110) through the input/output device (e.g., speaker and display). For example, the input/out interface 140 may output the voice data processed by the processor 120 to the user through the speaker.

The display 150 may present various information (e.g., multimedia data and text data) to the user.

The communication interface 160 may establish a communication connection of the electronic device 101 with an external device (e.g., electronic device 104 and server 106). For example, the communication interface 160 connects to the network 162 through a wireless or wired link for communication with the external device. Examples of the wireless communication technology may include wireless fidelity (Wi-Fi), Bluetooth (BT), Near Field Communication (NFC), GPS, and cellular communication technology (e.g., Long Term Evolution (LTE), LTE-Advanced (LTE-A), Code Division Multiple Access (CDMA), Wideband CDMA (WCDMA), Universal Mobile Telecommunication System (UMTS), Wireless-Broadband (WiBro), and General System for Mobile communications (GSM)). Examples of the wired communication technology may include Universal Serial Bus (USB), High Definition Multimedia Interface (HDMI), Recommended Standard 232 (RS-232), and Plain Old Telephone Service (POTS).

According to an embodiment of the present disclosure, the network 162 may be a telecommunication network. The communication network may include at least one of computer network, Internet, Internet of Things, or telephone network. According to an embodiment, the communication protocol between the electronic device 101 and an external device (e.g., transport layer protocol, data link layer protocol, and physical layer protocol) may be supported by at least one of the applications 134, API 133, middleware 132, kernel 131, or communication interface 160.

The application control module 170 may process at least some pieces of information acquired from other elements (e.g., the processor 120, the memory 130, the input/output interface 140, and the communication interface 160) and provide the processed information to a user through various methods. For example, the application control module 170 may recognize information on connection components included in the electronic device 101, store the information on the connection components in the memory 130, and execute one or more of the applications 134 based on the information on the connection components.

Figure 2:
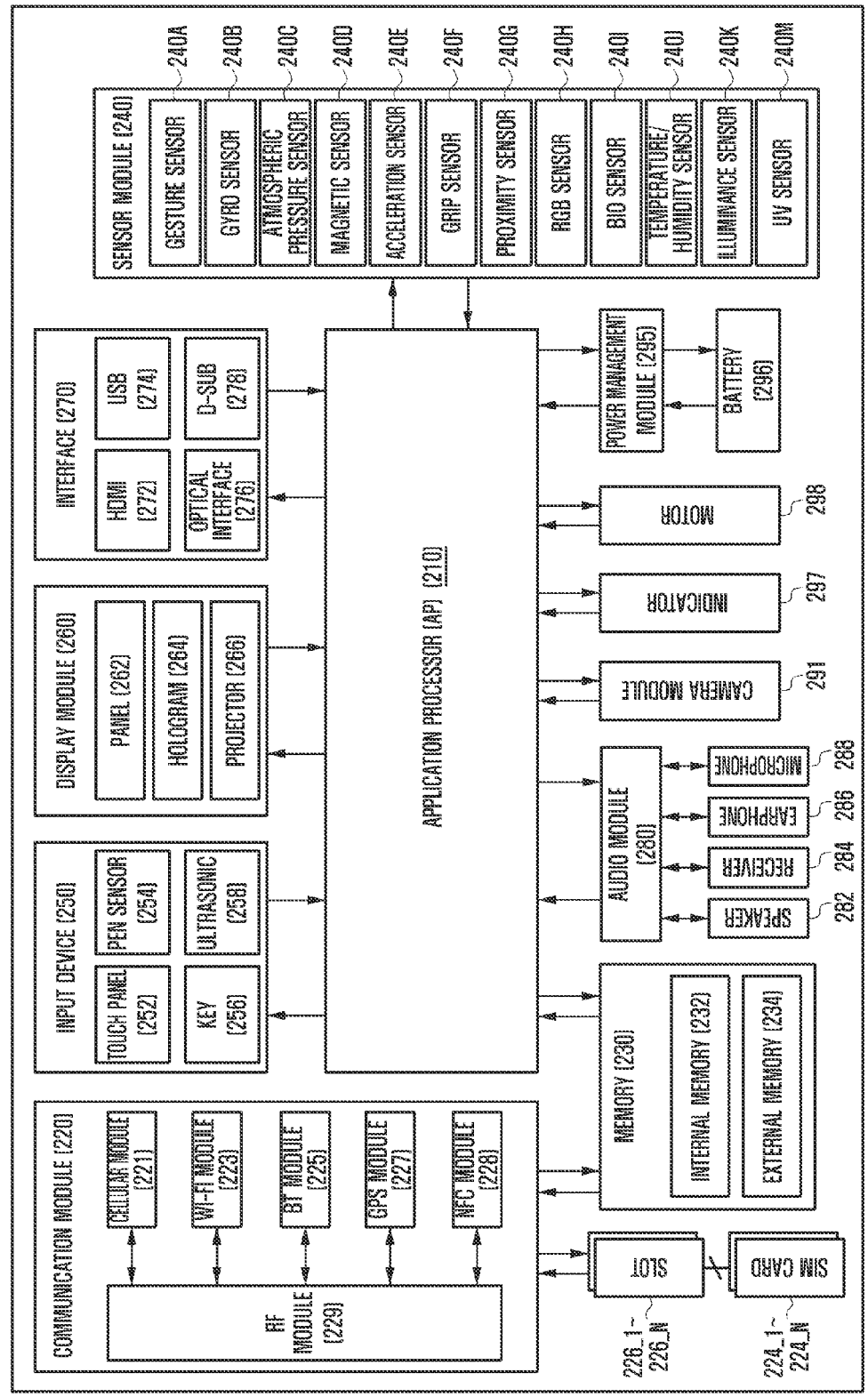
FIG. 2 is a block diagram of an electronic device according to various embodiments of the present disclosure.

FIG. 2 is a block diagram illustrating a configuration of the electronic device according to various embodiments of the present disclosure. The electronic device 201 may be of the whole or a part of the electronic device 101.

Referring to FIG. 2, the electronic device 201 may include an Application Processor (AP) 210, a communication module 220, a Subscriber Identity Module (SIM) cards 224_1 to 224_N, a memory 230, a sensor module 240, an input device 250, a display module 260, an interface 270, an audio module 280, a camera module 291, a power management module 295, a battery 296, an indicator 297, and a motor 298.

The AP 210 may operate an Operating System (OS) and/or application programs to control a plurality of hardware and/or software components connected to the AP 210 and perform data-processing and operations on multimedia data. For example, the AP 210 may be implemented in the form of System on Chip (SoC). According to an embodiment of the present disclosure, the AP 210 may include a Graphic Processing Unit (GPU) (not shown).

The communication module 220 (e.g., communication interface 160) may perform data communication with other electronic devices (e.g., electronic device 104 and server 106) through a network. According to an embodiment of the present disclosure, the communication module 220 may include a cellular module 221, a Wi-Fi module 223, a BT module 225, a GPS module 227, an NFC module 228, and a Radio Frequency (RF) module 229.

The cellular module 221 is responsible for voice and video communication, text messaging, and Internet access services through a communication network (e.g., LTE, LTE-A, CDMA, WCDMA, UMTS, WiBro, and GSM networks). The cellular module 221 may perform identification and authentication of electronic devices in the communication network using the SIM cards 224_1 to 224_N. According to an embodiment of the present disclosure, the cellular module 221 may perform at least one of the functions of the AP 210. For example, the cellular module 221 may perform at least a part of the multimedia control function.

According to an embodiment of the present disclosure, the cellular module 221 may include a Communication Processor (CP). The cellular module 221 may be implemented in the form of SoC. Although the cellular module 221 (e.g., communication processor), the memory 230, and the power management module 295 are depicted as independent components separated from the AP 210, the present disclosure is not limited thereto but may be embodied in a way that the AP includes at least one of the components (e.g., cellular module 221).

According to an embodiment of the present disclosure, each of the AP 210 and the cellular module 221 (e.g., communication processor) may load a command or data received from at least one of the components on a non-volatile or volatile memory and process the command or data. The AP 210 or the cellular module 221 may store the data received from other components or generated by at least one of other components in the non-volatile memory.

Each of the Wi-Fi module 223, the BT module 225, the GPS module 227, and the NFC module 228 may include a processor for processing the data it transmits/receives. Although the cellular module 221, the Wi-Fi module 223, the BT module 225, the GPS module 227, and the NFC module 228 are depicted as independent blocks; at least two of them (e.g., communication processor corresponding to the cellular module 221 and Wi-Fi processor corresponding to the Wi-Fi module 223) may be integrated in the form of SoC.

The RF module 229 is responsible for data communication, e.g., transmitting/receiving RF signals. Although not depicted, the RF module 229 may include a transceiver, a Power Amp Module (PAM), a frequency filter, and a Low Noise Amplifier (LNA). The RF module 229 also may include the elements for transmitting/receiving electric wave in free space, e.g., conductor or conductive wire. Although FIG. 2 is directed to the case where the Wi-Fi module 223, the BT module 225, the GPS module 227, and the NFC module 228 are sharing the RF module 229, the present disclosure is not limited thereto but may be embodied in a way that at least one of the Wi-Fi module 223, the BT module 225, the GPS module 227, or the NFC module 228 transmits/receives RF signals an independent RF module.

The SIM cards 224_1 to 224_N may be designed so as to be inserted into corresponding slots formed at a predetermined position (e.g., slots 226_1 to 226 N of the electronic device. The SIM cards 224_1 to 224_N may store unique identity information (e.g., Integrated Circuit Card Identifier (ICCID)) or subscriber information (e.g., International Mobile Subscriber Identity (IMSI)).

The memory 230 (e.g., memory 130) may include at least one of the internal memory 232 and an external memory 234. The internal memory 232 may include at least one of a volatile memory (e.g., Dynamic Random Access Memory (DRAM), Static RAM (SRAM), Synchronous DRAM (SDRAM) or a non-volatile memory (e.g., One Time Programmable Read Only Memory (OTPROM), Programmable ROM (PROM), Erasable and Programmable ROM (EPROM), Electrically Erasable and Programmable ROM (EEPROM), mask ROM, flash ROM, Not And (NAND) flash memory, or Not Or (NOR) flash memory)

According to an embodiment of the present disclosure, the internal memory 232 may be a Solid State Drive (SSD). The external memory 234 may be a flash drive such as Compact Flash (CF), Secure Digital (SD), micro-SD, Mini-SD, extreme Digital (xD), and Memory Stick. The external memory 234 may be connected to the electronic device 201 through various interfaces functionally. According to an embodiment of the present disclosure, the electronic device 201 may include a storage device (or storage medium) such as hard drive.

The sensor module 240 may measure physical quantity or check the operation status of the electronic device 201 and convert the measured or checked information to an electric signal. The sensor module 240 may include at least one of gesture sensor 240A, Gyro sensor 240B, barometric sensor 240C, magnetic sensor 240D, acceleration sensor 240E, grip sensor 240F, proximity sensor 240G, color sensor 240H (e.g., Red, Green, Blue (RGB) sensor), bio sensor 240I, temperature/humidity sensor 240J, illuminance sensor 240K, or Ultra Violet (UV) sensor 240M. Additionally or alternatively, the sensor module 240 may include E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 240 may further include a control circuit for controlling at least one of the sensors included therein.

The input device 250 may include a touch panel 252, a (digital) pen sensor 254, key 256, and an ultrasonic input device 258. The touch panel 252 may be one of capacitive, resistive, infrared, microwave type touch panel. The touch panel 252 may include a control circuit. In the case of the capacitive type touch panel, it is possible to detect physical contact or approximation. The touch panel 252 may further include a tactile layer. In this case, the touch panel 252 may provide the user with haptic reaction.

The (digital) pen sensor 254 may be implemented with a sheet with the same or similar way as touch input of the user or a separate recognition sheet. The key 256 may include physical buttons, optical key, and keypad. The ultrasonic input device 258 is a device capable of checking data by detecting sound wave through a microphone 288 and may be implemented for wireless recognition. According to an embodiment of the present disclosure, the electronic device 201 may receive the user input made by means of an external device (e.g., computer or server) connected through the communication module 220.

The display module 260 (e.g., display module 150) may include a panel 262, a hologram device 264, and a projector 266. The panel 262 may be a Liquid Crystal Display (LCD) panel or an Active Matrix Organic Light Emitting Diodes (AMOLED) panel. The panel 262 may be implemented so as to be flexible, transparent, and/or wearable. The panel 262 may be implemented as a module integrated with the touch panel 252. The hologram device 264 may present 3-dimensional image in the air using interference of light. The projector 266 may project an image to a screen. The screen may be placed inside or outside the electronic device. According to an embodiment of the present disclosure, the display module 260 may include a control circuit for controlling the panel 262, the hologram device 264, and the projector 266.

The interface 270 may include an HDMI 272, a USB 274, an optical interface 276, and a D-subminiature (D-sub) 278. The interface 270 may include the communication interface 160 as shown in FIG. 1. Additionally or alternatively, the interface 270 may include a Mobile High-definition Link (MHL) interface, an SD/MMC card interface, and Infrared Data Association (IrDA) standard interface.

The audio module 280 may convert sound to electric signal and vice versa. At least a part of the audio module 280 may be included in the input/output interface 140 as shown in FIG. 1. The audio module 280 may process the audio information input or output through the speaker 282, the receiver 284, the earphone 286, and the microphone 288.

The camera module 291 is a device capable of taking still and motion pictures and, according to an embodiment of the present disclosure, includes at least one image sensor (e.g., front and rear sensors), a lens (not shown), an Image Signal Processor (ISP) (not shown), or a flash (e.g., LED or xenon lamp) (not shown).

The power management module 295 may manage the power of the electronic device 201. Although not shown, the power management module 295 may include a Power Management Integrated Circuit (PMIC), a charger IC, a battery, and a battery or fuel gauge.

The PMIC may be integrated into an integrated circuit or SoC semiconductor. The charging may be classified into wireless charging and wired charge. The charger IC may charge the battery and protect the charger against overvoltage or overcurrent. According to an embodiment of the present disclosure, the charger IC may include at least one of wired charger or wireless charger ICs. Examples of the wireless charging technology includes resonance wireless charging and electromagnetic wave wireless charging, and there is a need of extra circuit for wireless charging such as coil loop, resonance circuit, and diode.

The battery gauge may measure the residual power of the battery 296, charging voltage, current, and temperature. The battery 296 may store or generate power and supply the stored or generated power to the electronic device 201. The battery 296 may include a rechargeable battery or a solar battery.

The indicator 297 may display operation status of the electronic device 201 or a part of the electronic device, booting status, messaging status, and charging status. The motor 298 may converts the electronic signal to mechanical vibration. Although not shown, the electronic device 201 may include a processing unit (e.g., GPU) for supporting mobile TV. The processing unit for supporting the mobile TV may be able to processing the media data abiding by the broadcast standards such Digital Multimedia Broadcasting (DMB), Digital Video Broadcasting (DVB), and media flow.

As described above, the electronic device operating method and apparatus of the present disclosure is capable of providing diverse screen displays in adaptation to various conditions to implement optimal environment for utilizing the electronic device, resulting in improvement of user convenience. Also, the electronic device operating method and apparatus of the present disclosure is advantageous in terms of facilitating navigation between folders by sorting the folders by hierarchical level.

The above enumerated components of the electronic device of the present disclosure may be implemented into one or more parts, and the names of the corresponding components may be changed depending on the kind of the electronic device. The electronic device of the present disclosure may include at least one of the aforementioned components with omission or addition of some components. The components of the electronic device of the present disclosure may be combined selectively into an entity to perform the functions of the components equally as before the combination.

The term "module" according to the various embodiments of the disclosure denotes, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of Application-Specific IC (ASIC) chip, Field-Programmable Gate Arrays (FPGAs), and Programmable-Logic Device known or to be developed for certain operations.

Figure 3:
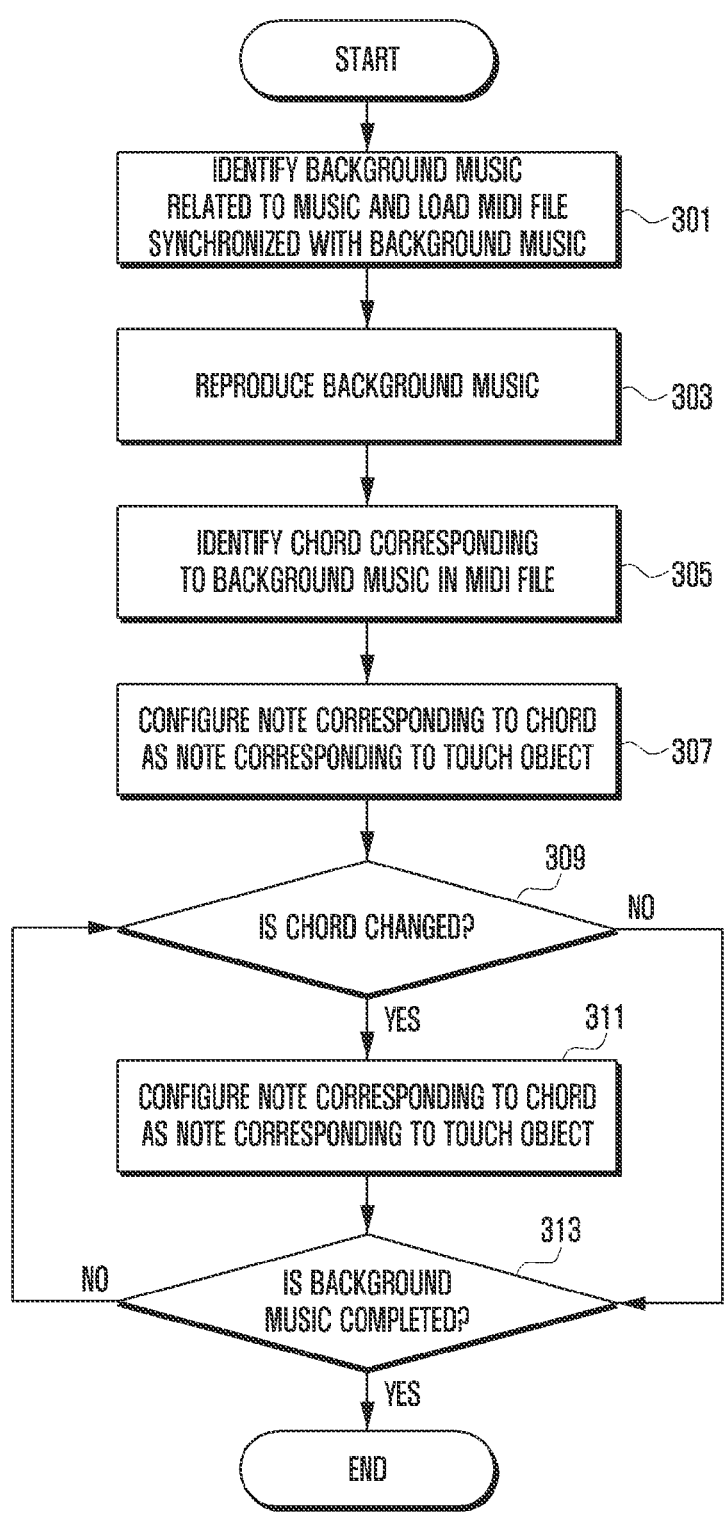
FIG. 3 is a flowchart illustrating a method for allowing a user to easily play music by configuring notes appropriate for chords of background music as notes corresponding to touch objects according to an embodiment of the present disclosure.

FIG. 3 is a flowchart illustrating a method for allowing a user to easily play music by configuring notes appropriate for chords of background music as notes corresponding to touch objects according to an embodiment of the present disclosure.

Referring to FIG. 3, in operation 301, the processor 120 of the electronic device 101 may identify Background Music (BGM) related to music selected by a user. The processor 120 may execute an application program (e.g., one or more of the applications 134) according to the present disclosure and reproduce the background music through the corresponding application program. The user may select background music related to music to play. Here, a chord (e.g., a harmony) in each measure of the background music may have been already identified by an application programmer on the basis of the music. In addition, the background music includes a key, a tempo, and a harmony, and the chords of the background music may be identified. In addition, the processor 120 of the electronic device 101 may load sound source data (e.g., a Musical Instrument Digital Interface (MIDI) file) synchronized with the background music. Here, the sound source data, for example the MIDI file, may be a file synchronized to progress of the background music. That is, the sound source data is synchronized with the background music and may be simultaneously executed when the processor 120 reproduces the background music. Without sound outputs, the sound source data may identify the chords of the background music at every appropriate timing (e.g., measure and beat) and provide information associated with the chords (e.g., chords and notes appropriate for the corresponding chords) to the application program. That is, the sound source data may include a ghost track for providing necessary information at each timing point (e.g., measure and beat). The sound source data may be a file created by an application programmer and stored in the memory of the electronic device. In operation 303, the processor 120 may reproduce the background music synchronized with the sound source data. In operation 305, the processor 120 may identify chords corresponding to the background music from the sound source data. In operation 307, the processor 120 may configure notes corresponding to the identified chords as notes corresponding to touch objects. The notes corresponding to the identified chords may be notes arbitrarily configured as musically well-matched notes by the application programmer in relation to the chords. The processor 120 may configure the notes well matched with the chords as the notes corresponding to the touch objects (e.g., user interfaces) displayed on the touch screen (e.g., the input/output interface 140). The touch objects (e.g., user interfaces), as graphic interfaces, may reproduce the configured notes in response to the user's touch input. In addition, the touch objects may be graphic interfaces in the form of rods or strings continuously arranged to configure notes. The processor 120 may configure notes in ascending order of pitch (the highness or lowness of a note) from the left of the touch objects. For example, the processor 120 may identify, in the existing touch objects, notes configured in order of "Do, Re, Mi, Fa, Sol, La, Si, Do, etc." However, in the case of chord "C," the processor 120 according to an embodiment of the present disclosure may configure notes in order of Do (1-octave), Mi (1-octave), Sol (1 octave), Do (2-octave), Mi (2-octave), Sol (2-octave), Do (3-octave), Mi (3-octave), Sol (3-octave), etc. (for example, 2-octave is an octave higher than 1-octave). That is, the processor 120 may reconfigure the notes, configured to the touch objects in order of existing piano keyboards, as notes appropriate for the identified chords. In operation 309, the processor 120 may identify whether the chords are changed when the background music is reproduced. When the chords are changed, the processor 120 may reconfigure notes corresponding to the chords as the notes corresponding to the touch objects, in operation 311. The notes corresponding to the chords, namely, the notes well-matched with the chords may be determined according to the application programmer's pre-configuration, and the types of notes may not be restricted. After configuring the notes corresponding to the chords as the notes corresponding to the touch objects in operation 311, the processor 120 may identify whether the background music has been terminated, in operation 313. When it is determined in operation 313 that the background music has not been terminated, the processor 120 may identify the background music's change in chords again, in operation 309. When it is determined in operation 309 that the chords have not been changed, the processor 120 may maintain the previously configured notes of the touch objects without reconfiguring the notes corresponding to the touch objects. In operation 313, the processor 120 may identify whether the background music has been terminated. That is, the processor 120 may identify the chords until the background music is terminated and reconfigure notes appropriate for the chords as the notes corresponding to the touch objects.

Figure 4A:
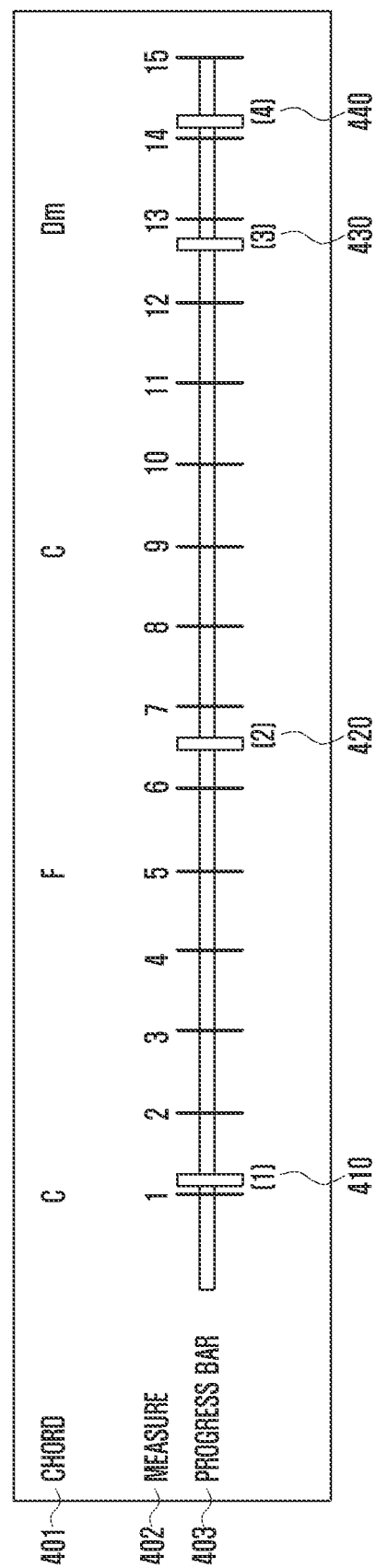
FIGS. 4A and 4B illustrate an example of configuring notes appropriate for chords of background music as notes corresponding to touch objects according to an embodiment of the present disclosure.
Figure 4B:
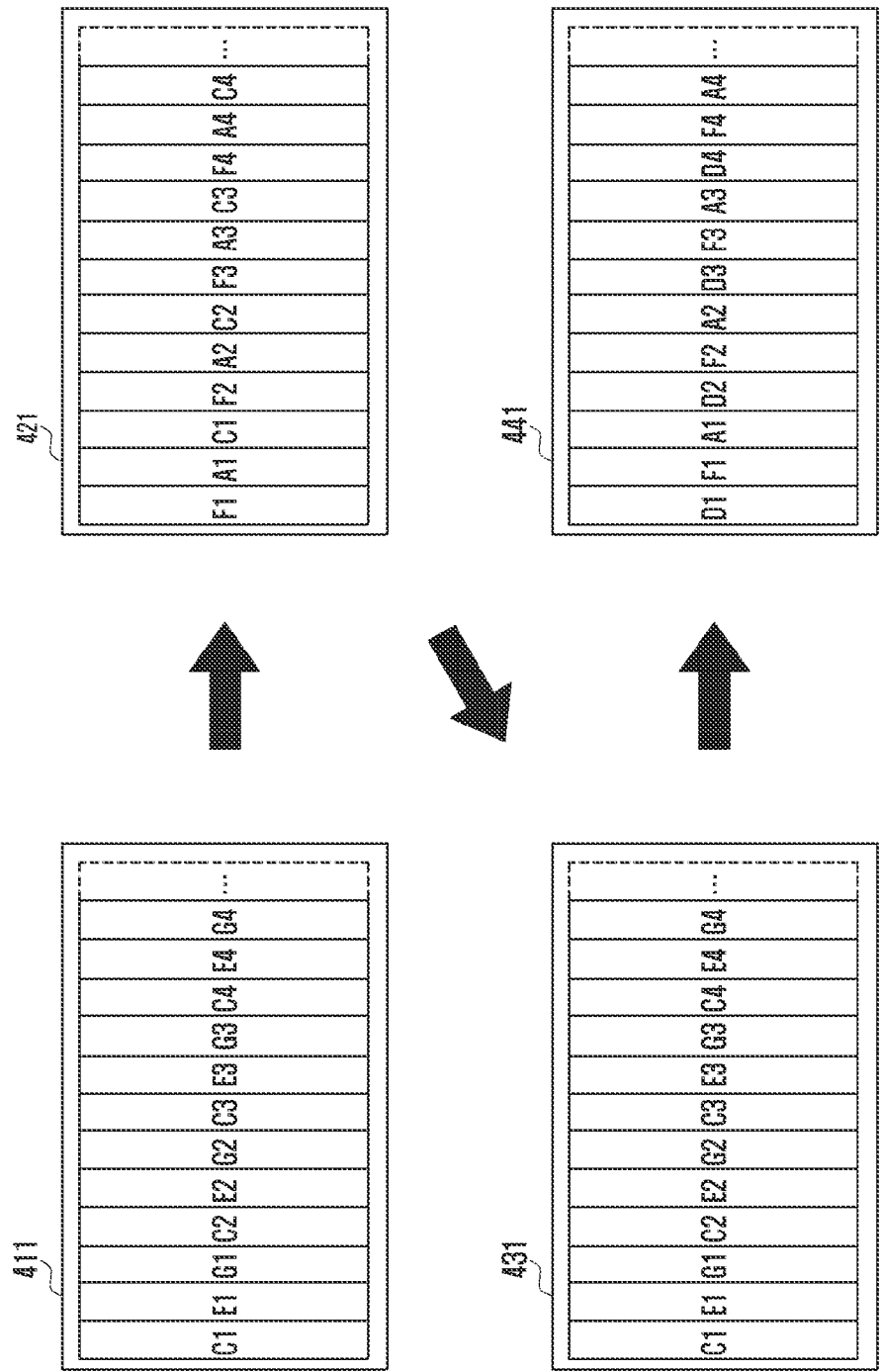

FIGS. 4A and 4B illustrate an example of configuring notes appropriate for chords of background music as notes corresponding to touch objects according to an embodiment of the present disclosure.

Referring to FIG. 4A, the processor 120 may identify chord progress of background music through sound source data having chords stored therein. The processor 120 may configure notes corresponding to the identified chord 401 as notes corresponding to touch objects displayed on the touch screen. Referring to FIG. 4A, a progress bar 403 displays the progress of the background music. That is, through the progress bar 403, the processor 120 may display a time point the background music is played. As a minimum unit viewable in a score, a measure 402 is a minimum unit of a musical piece into which the score is divided by vertical bar lines. The measure 402 may be a reference point where chords are changed. Referring to FIG. 4A, the processor 120 may identify that the chord of the background music in the first measure 402 corresponds to chord "C". The processor 120 may identify that the chord is changed from chord "C" to chord "F" in the fifth measure 402 and from chord "F" to chord "C" again in the ninth measure 402. Here, the processor 120 may identify the change in chord through the sound source data synchronized with the background music. That is, through the sound source data, the processor 120 may identify chord "C" in the first measure of the background music and configure appropriate notes "Do, Mi, and Sol" as notes corresponding to the touch objects in chord "C". An application programmer may not limit the appropriate notes in chord "C" to "Do, Mi, and Sol". That is, the notes configured as the notes corresponding to the touch objects may be changed by the programmer's determination. The processor 120 may maintain "Do, Mi, and Sol" configured in chord "C" until the fifth measure 402 and change the notes corresponding to the touch objects to "Fa, La, and Do" appropriate for chord "F" in the fifth measure 402. As the chord 401 is changed from chord "F" to chord "C" in the ninth measure 402, the processor 120 may change the notes corresponding to the touch objects, configured as "Fa, La, and Do", to "Do, Mi, and Sol" again. In addition, the processor 120 may identify that the chord of the background music is changed from chord "C" to chord "Dm" in thirteenth measure 402 and change the notes corresponding to the touch objects to "Re, Fa, and La." FIG. 4B illustrates examples of notes corresponding to the touch objects when the progress bar is located at time points 1 to 4 in FIG. 4A according to an embodiment of the present disclosure.

Referring to FIG. 4B, in a view indicated by reference numeral 411, the processor 120 may identify that the chord 401 at time point 1 in operation 410 corresponds to chord "C" and then configure C (Do), E (Mi), and G (Sol) as the notes corresponding to the touch objects. For example, in a view indicated by reference numeral 411, when a user interface of an application program has an array of rectangular rods, the processor 120 may configure, in the first measure 402, the notes corresponding to the touch objects in order of C1 (Do), D1 (Mi), G1 (Sol), C2 (Do an octave higher than C1), E2 (Mi an octave higher than D1), G2, C3, E3, G3, C4, etc. In a view indicated by reference numeral 421, the processor 120 may identify that the notes corresponding to the touch objects at time point 2 in operation 420 are arranged in order of F1 (Fa), A1 (La), C2 (Do), F2 (Fa an octave higher than F1), A2, C3, F3, A3, C4, etc. Referring to FIG. 4A, the processor 120 may identify that the chord of the background music is changed from chord "C" to chord "F" in the fifth measure 402. That is, the notes corresponding to the touch objects at time point 2 in operation 420 are configured in order of F (Fa), A (La), and C (Do) which are notes appropriate for chord "F". In a view indicated by reference numeral 431, the processor 120 may identify that the notes corresponding to the touch objects at time point 3 in operation 430 are changed in order of C1 (Do), D1 (Mi), G1 (Sol), C2, E2, etc. again. In a view indicated by reference numeral 441, the processor 120 may identify that the notes corresponding to the touch objects at time point 4 in operation 440 are arranged in order of D1 (Re), F1 (Fa), A1 (La), D2, F2, A2, D3, F3, A3, etc. Accordingly, the processor 120 may change configuration of the notes corresponding to the touch objects as the chords 401 of the background music are changed. In the method according to an embodiment of the present disclosure, the processor 120 identifies the chord 401 of the background music and change the configuration of the notes corresponding to the touch objects. Therefore, a user can play music with a touch input on the touch objects for which appropriate notes are configured according to the progress of the chord 401 of the background music, without having to identify the changed notes corresponding to the touch objects.

Figure 5:
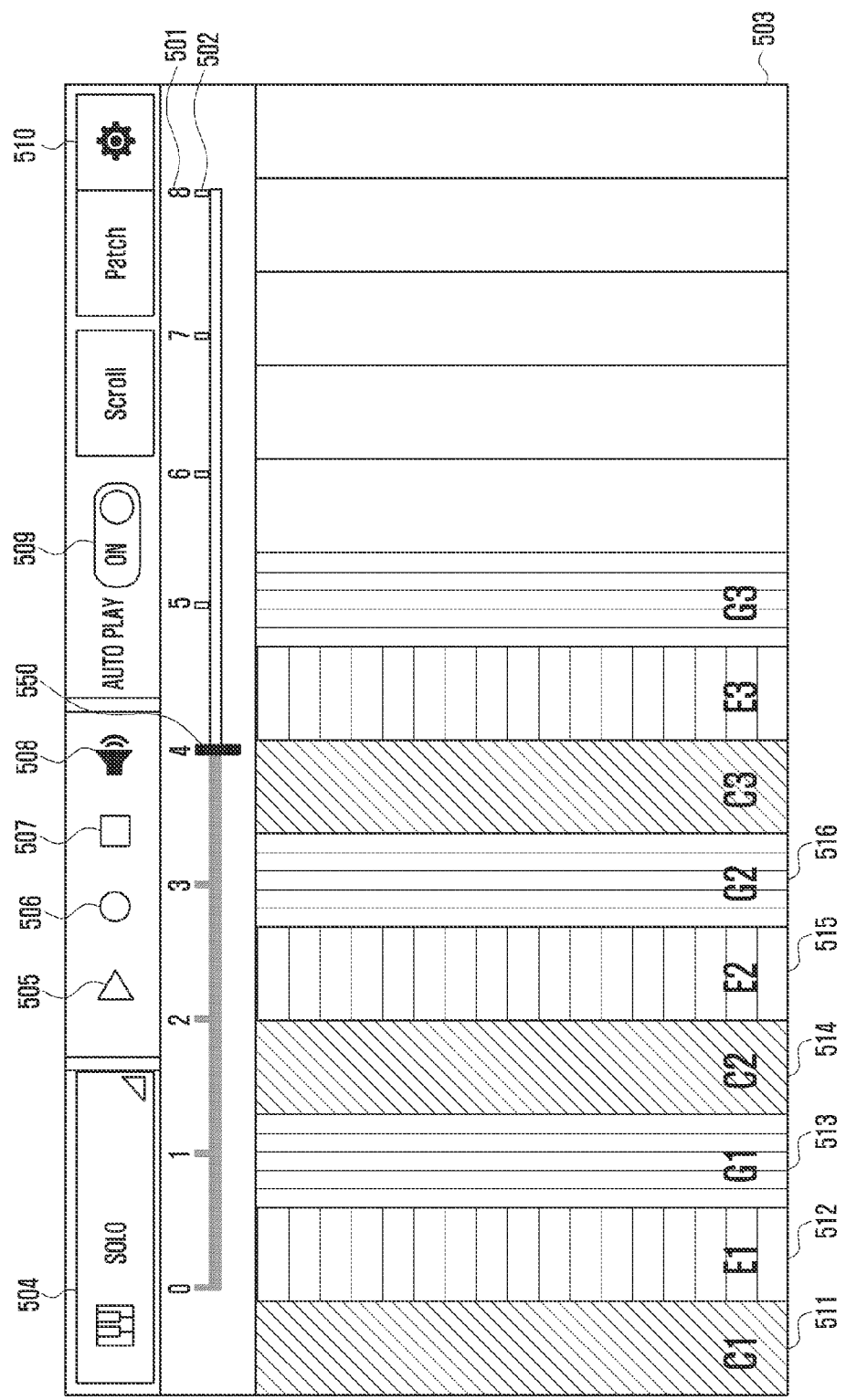
FIG. 5 illustrates an example of a method of playing music by configuring notes appropriate for chords of background music as notes corresponding to touch objects according to an embodiment of the present disclosure.

FIG. 5 illustrates an example of a method of playing music by configuring notes appropriate for chords of background music as notes corresponding to touch objects according to an embodiment of the present disclosure.

FIG. 5 illustrates a user interface (e.g., touch objects and various function keys) provided through an application program which can play music. The processor 120 may output the user interface through the touch screen (e.g., the panel 262). The touch screen may correspond to the panel 262 for displaying a screen and at the same time, may correspond to the touch panel 252 which may receive a user input. In relation to music, the processor 120 may play music through various techniques 504. The processor 120 may configure various types of notes corresponding to touch objects 503 according to the techniques 504 (e.g., a solo, a duet, a solo on each musical instrument, and ensemble). For example, in the case of a duet, the processor 120 may divide the user interface, having the touch objects 503 arranged therein, into left and right parts with respect to the center thereof and configure notes corresponding to the different touch objects. In relation to reproduction of the background music, the processor 120 may provide a reproduction key 505, a recording key 506, a stop key 507, a volume key 508, and an automatic play key 509 through which the background music may be automatically played on the basis of the score thereof. The processor 120 may display the progress of music through a progress bar 502 and change the notes corresponding to the touch objects by identifying chords, with measures 501 as reference points on the progress bar 502. In addition, the processor 120 may change various settings related to the user interface using a set key 510.

Referring to FIG. 5, the processor 120 may configure, to the touch object 503, an appropriate note corresponding to a chord in each of the measures 501. That is, the processor 120 may configure a note appropriate for the corresponding chord as the note corresponding to the touch object and display the configured note. For example, when the chord in the fourth measure 550 corresponds to chord "C", the processor 120 may configure C1 (Do) 511, D1 (Mi) 512, G1 (Sol) 513, C2 (Do an octave higher than C1) 514, E2 515, G2 516, C3, E3, G3, etc. from the leftmost to the rightmost of the touch objects. The processor 120 may display the same notes (e.g., C1 511, C2 514, and C3) in the same color such that a user can identify the reconfigured notes corresponding to the touch objects with the naked eyes. In addition, the processor 120 may also display, on the touch objects, information related to the reconfigured notes corresponding thereto. For example, the processor 120 may display names of musical scales, such as C1, D1, and G1. The processor 120 may record the music played by the user, using the recording key 506, and the user may compose music utilizing the recorded music. As described above, the method of playing music according to an embodiment of the present disclosure can enable a user uneducated on musical performance to easily play music through touch objects reconfigured as notes appropriate for chords.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of playing music in an electronic device comprising a touch screen, the method comprising:
   identifying, by the electronic device, the music selected by a user;
   identifying, by the electronic device, background music related to the music to load sound source data synchronized with the background music from a memory;
   playing, by the electronic device, the background music related to the music;
   identifying, by the electronic device, a chord corresponding to the played background music in the sound source data;
   configuring, by the electronic device, notes corresponding to the chord as notes corresponding to touch objects displayed on the touch screen; and
   reconfiguring, when the chord is changed, by the electronic device, notes corresponding to the changed chord as the notes corresponding to the touch objects.

2. The method of claim 1, further comprising:
   playing the notes corresponding to the touch objects in response to a touch input for the touch objects.

3. The method of claim 1, wherein the identifying of the chord corresponding to the played background music comprises:
   identifying the notes corresponding to the chord in the sound source data.

4. The method of claim 1, wherein the configuring of the notes corresponding to the chord as the notes corresponding to the touch objects displayed on the touch screen comprises:

configuring the notes corresponding to the chord as the notes corresponding to the touch objects in ascending order of pitch from one side of the touch objects.

5. The method of claim 1, wherein the background music is music comprising a key, a tempo, and a harmony by which the chord of the background music are to be identified.

6. The method of claim 1, wherein the sound source data is a file comprising information on the chord of the background music and information on the notes corresponding to the chord arbitrarily configured by an application programmer based on the chord.

7. The method of claim 1, wherein the touch objects are configured as the notes corresponding to the chord and to receive a touch input.

8. An electronic device comprising:
 a memory;
 a touch screen configured to display touch objects and to receive a touch input;
 a speaker configured to play background music related to music selected by a user and notes corresponding to the touch objects; and
 a processor configured to:
  identify the music selected by the user,
  identify the background music to load sound source data synchronized with the background music from a memory,
  play the background music related to the music,
  identify a chord corresponding to the played background music in the sound source data,
  configure notes corresponding to the chord as the notes corresponding to the touch objects, and
  reconfigure notes corresponding to changed chord as the notes corresponding to the touch objects, when the chord is changed.

9. The electronic device of claim 8, wherein the processor is further configured to identify the notes corresponding to the chord in the sound source data.

10. The electronic device of claim 8, wherein the processor is further configured to configure the notes corresponding to the chord as the notes corresponding to the touch objects in ascending order of pitch from one side of the touch objects.

11. The electronic device of claim 8, wherein the background music comprises a key, a tempo, and a harmony such that the chord of the background music are to be identified.

12. The electronic device of claim 8, wherein the sound source data comprises information on the chord of the background music and information on the notes corresponding to the chord arbitrarily configured by an application programmer based on the chord.

13. The electronic device of claim 8,
 wherein the touch objects are configured as the notes corresponding to the chord, and
 wherein the processor is further configured to play the notes corresponding to the touch objects in response to the touch input for touch objects.

14. At least one non-transitory processor readable medium storing a computer program of instructions configured to be readable by at least one processor for instructing the at least one processor to execute a computer process for performing a method comprising:
 identifying music selected by a user;
 identifying background music related to the music to load sound source data synchronized with the background music from a memory;
 playing the background music related to the music;
 identifying chord corresponding to the played background music in the sound source data;
 configuring notes corresponding to the chord as notes corresponding to touch objects displayed on the touch screen; and
 reconfiguring, when the chord is changed, notes corresponding to the changed chord as the notes corresponding to the touch objects.

15. The at least one non-transitory processor readable medium of claim 14, wherein the method further comprises:
 playing the notes corresponding to the touch objects in response to a touch input for the touch objects.

16. The at least one non-transitory processor readable medium of claim 14, wherein in the method, the identifying of the chord corresponding to the played background music comprises:
 identifying the notes corresponding to the chord in the sound source data.

17. The at least one non-transitory processor readable medium of claim 14, wherein in the method, the configuring of the notes corresponding to the chord as the notes corresponding to the touch objects displayed on the touch screen comprises:
 configuring the notes corresponding to the chord as the notes corresponding to the touch objects in ascending order of pitch from one side of the touch objects.

18. The at least one non-transitory processor readable medium of claim 14, wherein in the method, the background music is music comprising a key, a tempo, and a harmony by which the chord of the background music are to be identified.

19. The at least one non-transitory processor readable medium of claim 14, wherein in the method, the sound source data is a file comprising information on the chord of the background music and information on the notes corresponding to the chord arbitrarily configured by an application programmer based on the chord.

20. The at least one non-transitory processor readable medium of claim 14, wherein in the method, the touch objects are configured as the notes corresponding to the chord and to receive a touch input.

* * * * *